(12) United States Patent  (10) Patent No.: US 8,460,004 B2
Crelin  (45) Date of Patent: Jun. 11, 2013

(54) MOON GAZERS' WHEEL CHART

(76) Inventor: Robert Crelin, Guilford, CT (US)

(*) Notice: Subject to any disclaimer, the term of this patent is extended or adjusted under 35 U.S.C. 154(b) by 390 days.

(21) Appl. No.: 12/782,259

(22) Filed: May 18, 2010

(65) Prior Publication Data

US 2010/0291525 A1 Nov. 18, 2010

Related U.S. Application Data

(60) Provisional application No. 61/216,416, filed on May 18, 2009.

(51) Int. Cl.
*G09B 27/02* (2006.01)

(52) U.S. Cl.
USPC .............. 434/292; 434/284; 434/285; 368/16

(58) Field of Classification Search
USPC .......................................... 434/284, 285, 292
See application file for complete search history.

(56) References Cited

U.S. PATENT DOCUMENTS

| | | | | |
|---|---|---|---|---|
| 3,674,987 A | * | 7/1972 | Addabbo | .................. 235/88 N |
| 3,745,313 A | * | 7/1973 | Spilhaus | .................. 235/88 R |
| 4,194,306 A | * | 3/1980 | Rogers | ........................ 434/285 |
| 5,114,348 A | * | 5/1992 | Tzeng | .......................... 434/284 |
| 5,974,001 A | | 10/1999 | Barton | |
| 7,251,198 B2 | | 7/2007 | Barton | |
| 2004/0141422 A1 | * | 7/2004 | Fitchet | ............................ 368/18 |

* cited by examiner

*Primary Examiner* — Gene Kim
*Assistant Examiner* — Joseph B Baldori
(74) *Attorney, Agent, or Firm* — St. Onge Steward Johnston & Reens LLC

(57) ABSTRACT

An educational field chart used for observing the Moon. The two-piece chart has an indicator wheel joined with a background chart that depicts the Sun, Earth and the Moon in orbit. The pieces rotate to locate a moon phase illustration that matches the Moon in the sky. Once set, a user can automatically determine facts and aspects about the Moon during this phase. Information aligns on both pieces to tell the following about the Moon: a) the moon phase name, b) the position of the Moon in orbit going around Earth, c) the rise & set time of the phase, and when it is visible in the sky, and d) the approximate day of the phase in the lunar month. The illustrations on the chart also visually correlate the relationship of the Sun, Earth and Moon during each moon phase.

20 Claims, 4 Drawing Sheets

MOON GAZERS' WHEEL CHART

CROSS-REFERENCE TO RELATED APPLICATIONS

The present application claims the benefit under 35 U.S.C. §119 (e) of the Provisional Patent Application Ser. No. 61/216,416, filed on May 18, 2009. The contents of Provisional Patent Application Ser. No. 61/216,416, filed on May 18, 2009 are hereby incorporated by reference

FIELD OF THE INVENTION

An educational field chart used for observing the Moon having an indicator wheel joined with a background chart that depicts the Sun, Earth and the Moon in orbit and provides information to a user about the Moon's phases.

BACKGROUND OF THE INVENTION

The present invention is an observer's tool that is manually set to visually identify the phase of the Moon in the sky. When set, the chart simultaneously correlates the Moon's orbital position, the day of the lunar month, the time period the phase is visible, and various other aspects of the Moon/Earth/Sun relationship.

For centuries, moveable wheel charts have been used as field guides to locate and learn about stars and constellations in the night sky.

A moon phase wheel chart and moon phase device are known, as in U.S. Pat. Nos. 5,974,001 and 7,251,198B2, both to Barton, however both inventions are devices designed to determine the moon phase of a particular date. These do not explain or show why the Moon displays phases, nor do these references inform the user how to relate what they see in the sky to the Moon's orbit around Earth.

Therefore, there is a need for a device that can simply illustrate and explain how and when moon phases happen, the device being inexpensive, small and lightweight for easy use in the field. Such a device should be understandable to the layperson, and be able to impart a fundamental understanding about the relationship of the Moon, Earth and Sun.

SUMMARY OF THE INVENTION

Accordingly, it is an object of the present invention to provide a device that can achieve these objectives, namely that the device simply illustrates and explains how and when moon phases happen.

It furthermore is preferable for the device to be inexpensive, small and lightweight for easy use in the field, and also that the device is understandable to a layperson, and is able to impart a fundamental understanding about the relationship of the Moon, Earth and Sun.

These and other objectives are achieved by providing a field reference chart (Moon Gazers' Wheel) for identifying the phase of the Moon comprising: an indicator wheel having information that relates to finding the Moon in the sky; a background chart having information that relates to the phase of the Moon, the information providing each phase of the Moon; and a fastener, the fastener joining the indicator and the background chart at a common center, wherein the indicator wheel is aligned with the information on the background chart that relates to the different phases of the Moon, and wherein upon the rotation of the indicator wheel or the background chart, each of the phases of the Moon are revealed.

The indicator wheel may have a phase window cut into the edge of its outer circumference. The phase window may be V-shaped. Each of the phases of the Moon on the background chart member may be revealed through the phase window.

Each of the phases of the Moon may include the name of the phase and the moon phase illustration. There are eight primary Moon phases: New Moon, Waxing Crescent, First Quarter, Waxing Gibbous, Full Moon, Waning Gibbous, Last Quarter and Waning Crescent. The total number of moon phase illustrations may include additional illustrations depicting progressive stages of crescent, or gibbous phases, when both waxing and waning (bringing the total number of phases up to twelve, which is shown in the Figures). The indicator wheel may have indicia adjoining both sides of the phase window directing a user to reveal the moon phase illustration that matches the appearance of the moon in the sky.

The indicator wheel may have indicia of a person looking up into the phase window to suggest that the moon phase illustration in the phase window represents how a user would see the phase of the Moon from the earth's surface. Because the visual appearance of moon phases for viewers in Earth's southern hemisphere can vary in orientation when compared to their appearance in the northern hemisphere, the invention may be used in alternative embodiments which represent either the northern, or southern hemisphere view of the moon phases.

The indicator wheel may have at least one pointer arrow extending off the outer edge of the indicator wheel. Preferably, there are two pointer arrows extending off the outer edge of the indicator wheel on opposite sides. The pointer arrows may be large or small. The two pointer arrows may point to the time of day the Moon rises and the time of day the Moon sets on the background chart, respectively.

The background chart may have eight or more illustrations depicting the Moon orbiting Earth and encircling the indicator wheel. The background chart may have an illustration of the Sun at the base of the background chart to indicate its position in relationship to Earth and to the Moon.

Each of the illustrations depicting the Moon orbiting Earth may depict how the sun-facing half of the Moon is in sunlight and the opposite half is in shade. Each of the illustrations depicting the Moon orbiting Earth may correspond with a moon phase illustration, to relate the Moon's orbital position during the phase.

The background chart may have a sequence of numbers from number 1 through 29 encircling the moon orbit illustrations on the background chart. The numbers indicate the passing days of the approximate 29.5-day lunar month, which correlates to one complete orbit of the Moon around Earth.

The information on the indicator wheel and information on the background chart may be typeset in a circular format, so that a user may easily read the corresponding text simultaneously.

Other objectives of the invention include providing a method for identifying the phase of the Moon using a fastener chart comprising an indicator wheel, a background chart, and a fastener joining the indicator and the background chart at a common center, the method comprising the steps of: rotating the indicator wheel and the background chart by hand; locating one of moon phase illustrations that matches the actual appearance of the Moon in the sky; and setting the indicator wheel and the background chart to reveal a phase illustration in the phase window, wherein the indicator wheel is automatically aligned with other information on the background chart that relates to a moon phase.

Once the indicator wheel is rotated to match the actual Moon's appearance with the phase illustration on the chart, the name of the phase and other aspects of the Moon's orbit around Earth can be derived from the alignment of information on the indicator wheel and the background chart.

Other objectives of the invention include providing an adjustable field reference chart, used for identifying the phase of the Moon. The Moon Gazers' Wheel chart typically comprises of two semi-circular members, an indicator wheel and background chart, joined by fastener at a common center. These two members can be rotated by hand to locate one of moon phase illustrations that match the actual appearance of the Moon in the sky. By setting the members to reveal a phase illustration in the phase window, the indicator wheel is automatically aligned with other information on the background chart that relates to the moon phase. The information on both the indicator wheel and background chart is typeset in a circular format, to allow the user to easily read the corresponding text simultaneously.

The indicator wheel includes a V-shaped, phase window, which is cut into the edge of its outer circumference. As either member is rotated, each of the moon phase illustrations and phase names on the background chart member are revealed through the V-shaped window. Text stating, "the phase you see" adorns both sides of the V-shaped phase window, directing the user to reveal the moon phase illustration that matches the appearance of the Moon in the sky.

A whimsical illustration of Earth is at the center of the indicator wheel. Sitting upon Earth is an illustration of an oversized person looking up into the phase window. The purpose of this is to imply that the phase illustration in the phase window represents how we see the moon phase from Earth's surface.

Below and perpendicular to the phase window, two large pointer arrows extend off the outer edge on opposite sides of the indicator wheel. On the northern hemisphere embodiment of the invention: the right side arrow is marked "Moon Rises", and points to times of day and night on the background chart, which encircle the indicator wheel. Similarly, the left side arrow is marked "Moon Sets", and also points to times of day and night on the background chart. Conversely, on the southern hemisphere embodiment of the invention, the left side arrow is the moon rise pointer, and the right side is the moon set pointer. When a moon illustration is revealed in the phase window, the moon rise arrow points to the approximate time of day, or night that the moon phase rises. The moon set arrow points to the approximate time of day, or night that the moon phase sets. The times of day and night, starting with the rise time and continuing around to the set time depicts the period when the moon phase is seen in the sky, as noted along the edge of the indicator wheel. Conversely, the times of day and night, starting with the set time and continuing around to the rise time depicts the period when the Moon phase is not seen in the sky, also as noted along the edge of the indicator wheel.

On the background chart, illustrations that depict the Moon at different positions in orbit around Earth encircle the indicator wheel. An illustration of the Sun is at the base of the background chart to indicate its position in relationship to Earth and to the Moon. Each moon illustration of the orbit depicts how the sun-facing half of the Moon is in sunlight and the opposite half is in the shade. Each moon orbit illustration corresponds with each phase illustration, to relate the Moon's orbital position during the phase.

Encircling the moon orbit illustrations on the background chart is a sequence of numbers, from number 1 through 29. These numbers indicate the passing days of the approximate 29.5-day lunar month, which correlates to one complete orbit of the Moon around Earth. The day number and moon orbit position are indicated because they sit directly above the corresponding phase illustration, when it is revealed in the phase window of the indicator wheel.

Once the wheel is rotated to match the actual Moon's appearance with the phase illustration on the chart, the name of the phase and other aspects of the Moon's orbit around Earth can be derived from the alignment of information on the indicator wheel and the background chart.

Additionally, the invention is not limited to these embodiments, as other combinations to produce a laminated product are contemplated by the invention. Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

For general reference: All drawings represent a northern hemisphere embodiment of the invention. All drawings represent the invention using a moon phase sequence of twelve phase illustrations. This sequence is comprised of the eight primary moon phases plus one extra progressive stage of each crescent and gibbous phase—both waxing and waning.

DETAILED DESCRIPTION OF THE INVENTION

Figure 1:
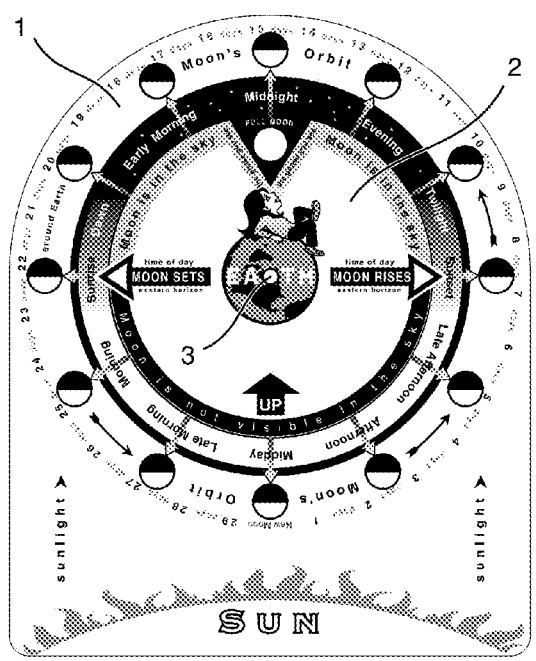
FIG. 1 is a top elevation view of the assembled field reference chart (Moon Gazers' Wheel chart)
Figure 1A:
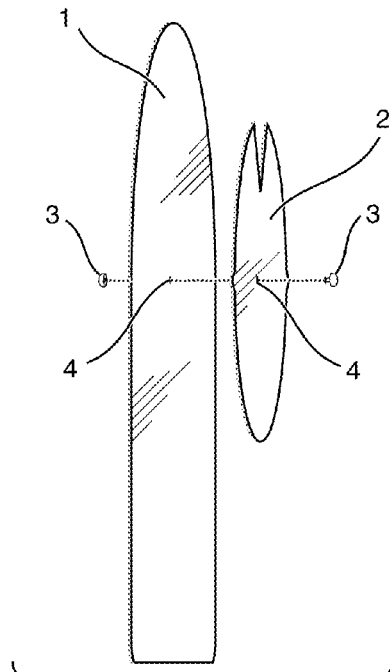
FIG. 1a is an oblique side view of the field reference chart shown as exploded into the separate parts.

Referring to FIG. 1, the field reference chart (Moon Gazers' Wheel chart) is shown as assembled and comprises two semi-circular members being the background chart 1, and the indicator wheel 2, joined by a fastener 3. Both members can be freely rotated when fastened together. FIG. 1a is an exploded, oblique side view to show both members 1 and 2, and how the fastener 3 attaches them together at a common center hole 4.

Figure 1B:
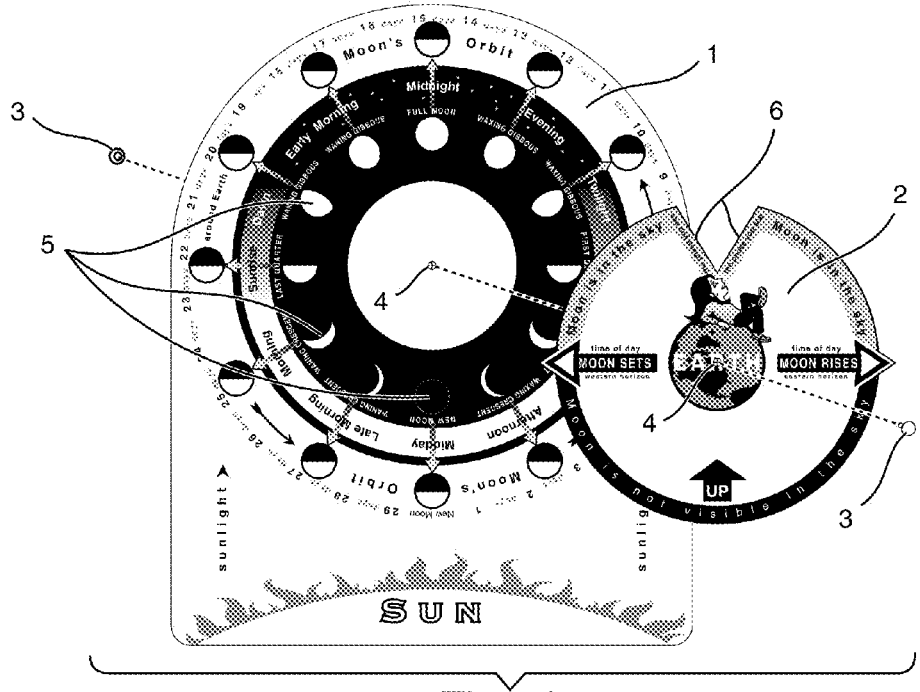
FIG. 1b is a top elevation view of the field reference chart shown as exploded into the separate parts.

FIG. 1b is an exploded, top elevation view that reveals how, when assembled, the indicator wheel 2 hides eleven of the twelve moon phase illustrations 5 printed on the background chart. The phase illustrations 5 include the eight primary moon phases: New Moon, Waxing Crescent, First Quarter, Waxing Gibbous, Full Moon, Waning Gibbous, Last Quarter and Waning Crescent—plus one extra progressive stage of the Waxing Crescent, Waxing Gibbous, Waning Gibbous and Waning Crescent phases. The twelve moon phase illustrations 5 represent the actual sequence of phases seen throughout one twenty-nine day lunar month, from New Moon to New Moon. One phase illustration at a time is viewed inside of the V-shaped phase window 6 of the indicator wheel. As either member 1 or 2 is rotated, different moon phase illustrations can be seen inside of the phase window 6 of the indicator wheel 2.

Figure 2:
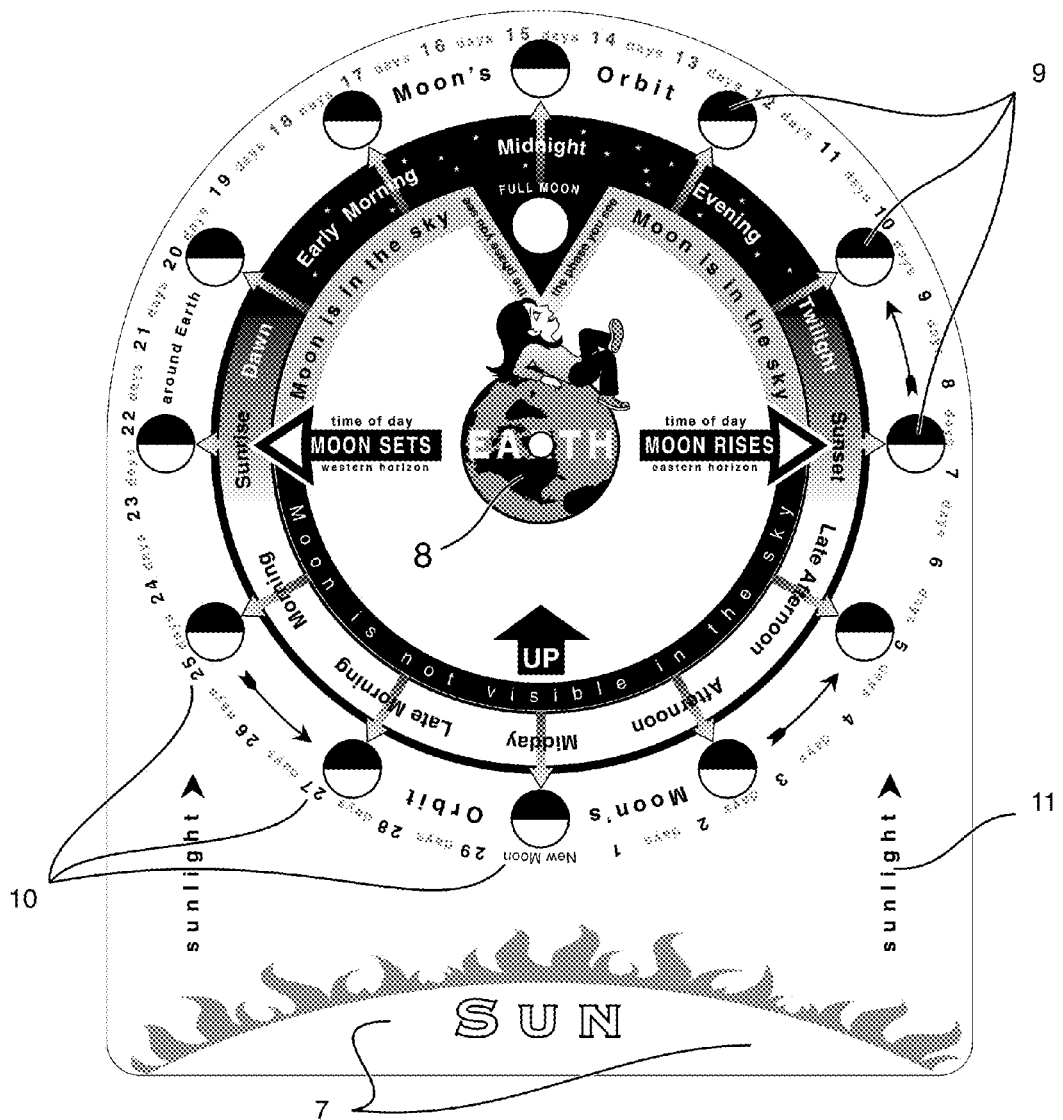
FIG. 2 is a top elevation view of the assembled field reference chart.

FIG. 2 shows the field reference chart (The Moon Gazers' Wheel chart) and depicts the physical relationship of the Sun 7, Earth 8 and the Moon moving in orbit 9, so the user can relate the observed moon phase to the relative positions of these three celestial bodies. The direction of sunlight 11 is indicated to show how the sun-facing half of the Moon's globe 9 is illuminated, while the opposite half is in shadow. In a counter clockwise direction, sequential numbers 10 mark the passing days of the Moon's 29.5-day lunar month, from New Moon to New Moon. These day numbers 10 encircle the twelve moon orbit illustrations 9 to show the approximate physical position of the Moon moving in orbit around Earth 8 throughout the lunar month.

Figure 3:
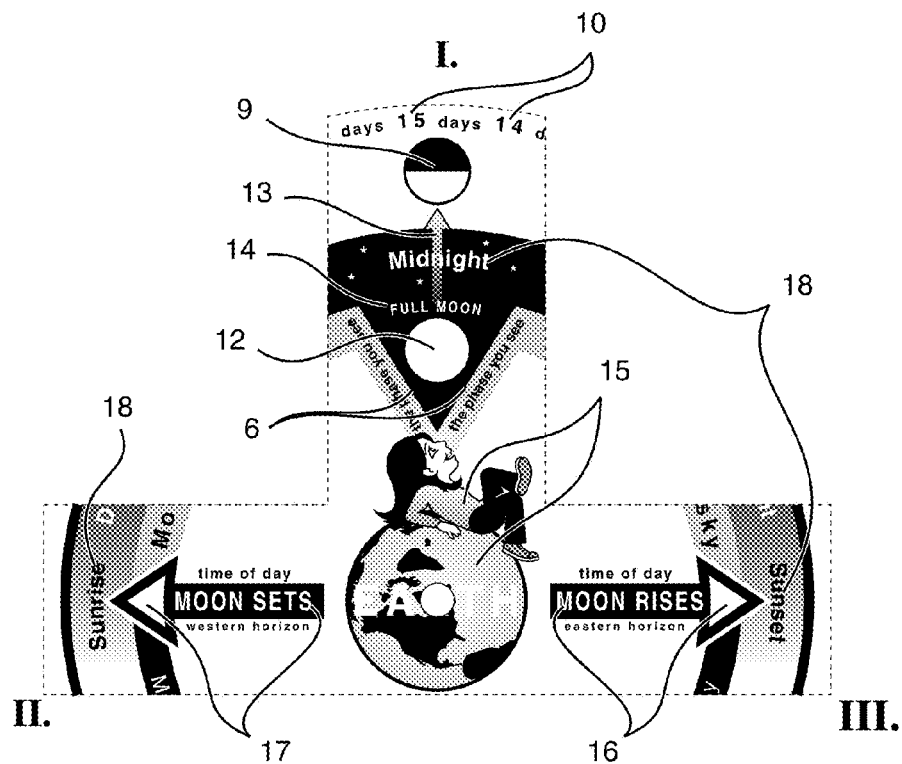
FIG. 3 is a cutaway close-up showing aspects of the indicator wheel and background chart that determine moon phase information.
Figure 3:
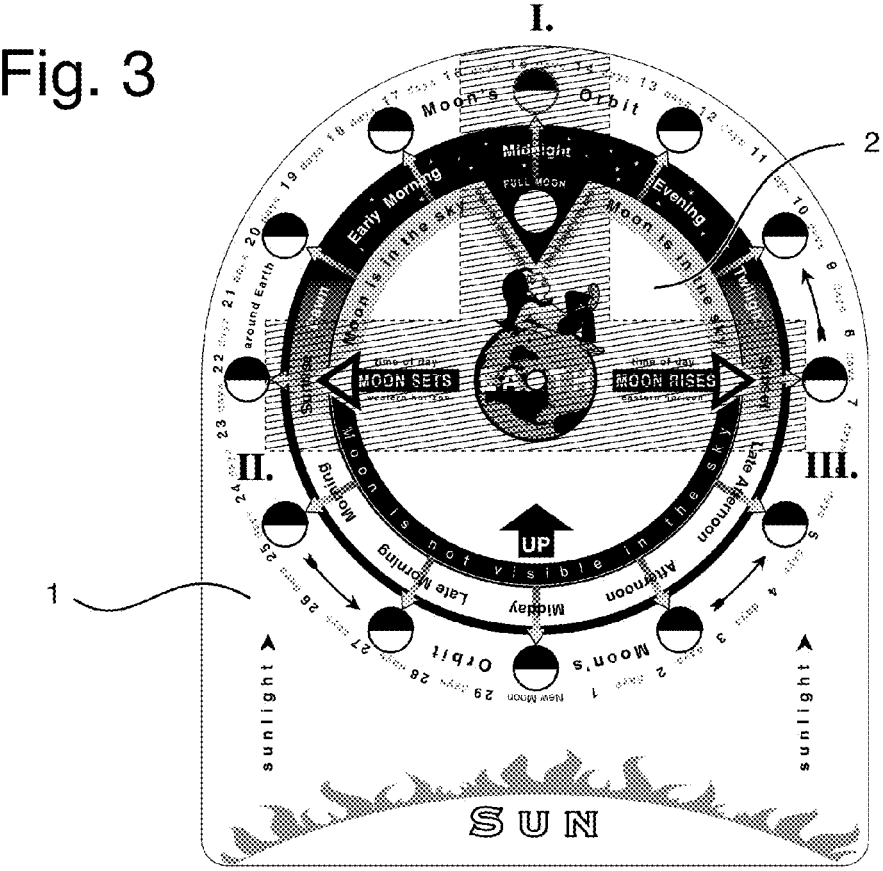

FIG. 3 provides a cutaway close-up of the field reference chart and depicts the alignment of the information and illustrations on both the indicator wheel 2 and the background chart 1. On the cutaway close-up, the background chart has been rotated to reveal both the chosen moon phase illustration 12, and the name of the phase 14 inside of the phase window 6. The arrow 13, above the phase name points to the orbital position of the Moon 9 at this phase. Above the orbital position 9, there are sequential numbers 10 indicating the day, or days of the lunar month for this phase. The whimsical illustration of the person sitting on Earth 15 is to reinforce the idea that the appearance of the Moon in the phase window 6 is how we see the Moon from Earth's surface.

The pointers 16 and 17 of the indicator wheel point to different times of day and night 18, which encircle the indicator wheel. The moon rise pointer 16, points to the approximate time of day or night 18 that the moon phase 12 in the phase window 6 can be seen rising above the eastern horizon. Concurrently, the moon set pointer 17, points to the approximate time of day or night 18 that the moon phase can be seen setting below the western horizon.

Figure 4:
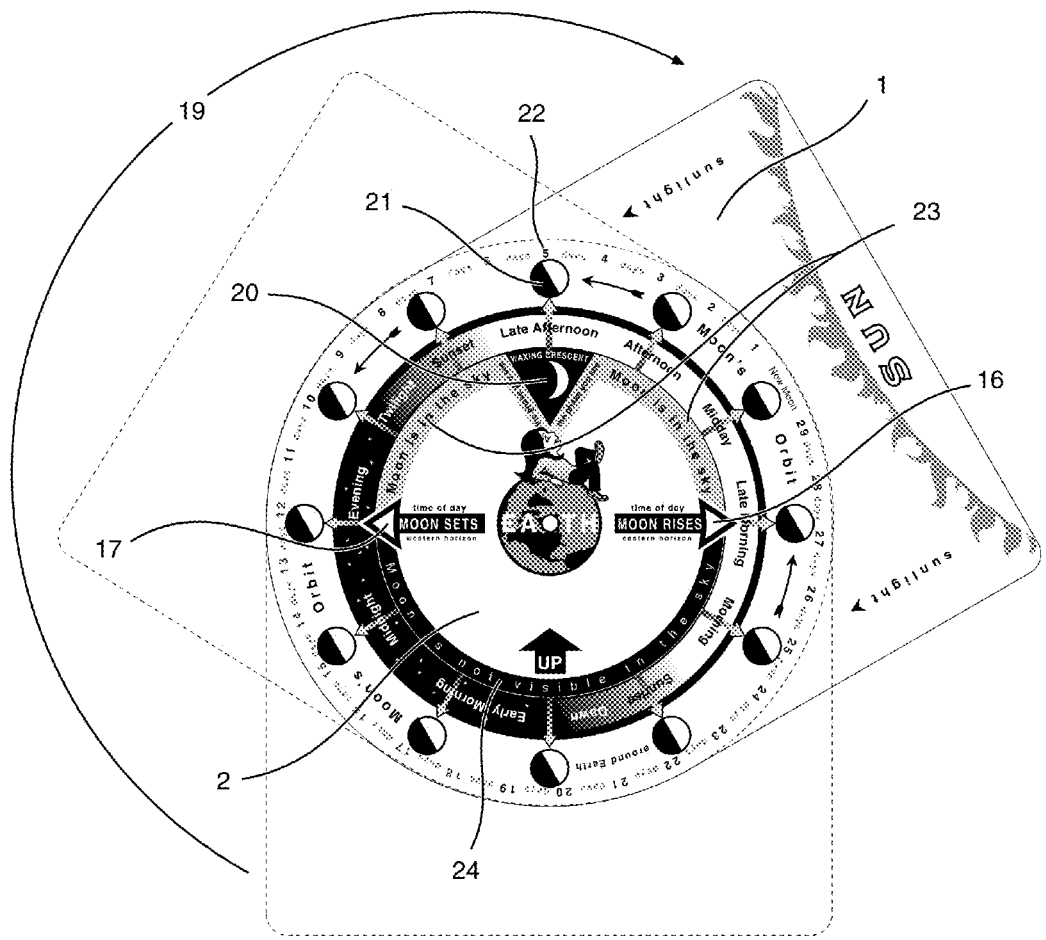
FIG. 4 is a top elevation view of the assembled field reference chart illustrating how information is derived when the members are rotated and set to a moon phase

FIG. 4 is another view of the field reference chart showing how it is used to explain different aspects about the moon phase seen in the sky. The background chart 1 of the Moon Gazers' Wheel chart is rotated 19 to reveal the matching phase illustration 20 inside the phase window of the indicator wheel 2. Once set on the chosen phase illustration 20, the other information about the Moon at this phase is automatically available. This information includes: the Moon's physical position in orbit around Earth 21, the day of the lunar month 22, the moon rise time indicated by the pointer 16, and the moon set time indicated by the pointer 17.

The times of day or night when the moon phase can be seen in the sky are between the rise time 16, and the set time 17, as noted on the indicator wheel 23. The times when the moon phase cannot be seen are between the set time 17 and the rise time 16, as noted on the indicator wheel 24.

While the invention has been specifically described in connection with certain specific embodiments thereof, it is to be understood that this is by way of illustration and not of limitation and that various changes and modifications in form and details can be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A field reference chart for correlating the phase of the Moon, the day of the lunar month, and the time period that the phase of the Moon is visible, the field reference chart consisting of:
    a one-piece background chart, said background chart having information that relates to the phase of the Moon, said information providing each of the phases of the Moon;
    an indicator wheel, said indicator wheel having information that relates to finding the Moon in the sky, said indicator wheel being aligned with said information on said background chart that relates to the phases of the Moon,
    said indicator wheel having a phase window cut into the edge of its outer circumference, where indicia adjoins both sides of the phase window, the indicia directing a user to reveal the moon phase illustration that matches the appearance of the Moon in the sky,
    said indicator wheel having two pointer arrows extending off the outer edge of said indicator wheel on opposite sides, the two pointer arrows simultaneously pointing to the time of day the Moon rises and the time of the day Moon sets on said background chart, respectively,
    such that upon rotation of said indicator wheel or said background chart, each of said phases of the Moon are revealed through the phase window; and
    a fastener, said fastener joining said indicator and said background chart at a common center.

2. The field reference chart of claim 1, wherein said phase window is V-shaped.

3. The field reference chart of claim 2, wherein each of said phases of the Moon on said background chart member are revealed through said phase window.

4. The field reference chart of claim 1, wherein each of said phases of the Moon include the name of the phase and the moon phase illustration.

5. The field reference chart of claim 1, wherein said indicator wheel has indicia of a person looking up into said phase window to suggest that the moon phase illustration in the phase window represents how a user would see the phase of the Moon from Earth's surface.

6. The field reference chart of claim 1, wherein said background chart has illustrations depicting the Moon orbiting the earth encircling said indicator wheel.

7. The field reference chart of claim 6, wherein said background chart has an illustration of the Sun at the base of said background chart to indicate its position in relationship to Earth and to the Moon.

8. The field reference chart of claim 7, wherein each of said illustrations depicting the Moon orbiting the earth depicts how the sun-facing half of the Moon is in sunlight and the opposite half is in shade.

9. The field reference chart of claim 8, wherein each of said illustrations depicting the Moon orbiting the earth corresponds with a moon phase illustration, to relate the Moon's orbital position during the phase.

10. The field reference chart of claim 9, wherein encircling the moon orbit illustrations on the background chart is a sequence of numbers from number 1 through 29.

11. The field reference chart of claim 10, wherein said numbers indicate the passing days of the approximate 29.5-day lunar month, which correlates to one complete orbit of the Moon around Earth.

12. The field reference chart of claim 1, wherein said information on said indicator wheel and information on said background chart is typeset in a circular format, so that a user may easily read the corresponding text simultaneously.

13. A method for identifying the phase of the Moon using a fastener chart comprising an indicator wheel, a background chart, and a fastener joining said indicator and said background chart at a common center, the method comprising the steps of:

rotating said indicator wheel and said background chart by hand;

locating one of moon phase illustrations that matches the actual appearance of the Moon in the sky; and setting said the indicator wheel and said background chart to reveal a phase illustration in the phase window, wherein the indicator wheel is automatically aligned with other information on the background chart that relates to a moon phase.

14. The method of claim 13, wherein once said indicator wheel is rotated to match the actual Moon's appearance with the phase illustration on the chart, the name of the phase and other aspects of the Moon's orbit around Earth can be derived from the alignment of information on said indicator wheel and said background chart.

15. A field reference chart for correlating the phase of the Moon, the day of the lunar month, and the time period that the phase of the Moon is visible, the field reference chart consisting of:

a background chart, said background chart having information that relates to the phase of the Moon, said information providing each of the phases of the Moon;

an indicator wheel, said indicator wheel having information that relates to finding the Moon in the sky, said indicator wheel being aligned with said information on said background chart that relates to the phases of the Moon, said indicator wheel having a phase window cut into the edge of its outer circumference, where indicia adjoins both sides of the phase window, the indicia directing a user to reveal the moon phase illustration that matches the appearance of the Moon in the sky, said indicator wheel having two pointer arrows extending off the outer edge of said indicator wheel on opposite sides, the two pointer arrows simultaneously pointing to the time of day the Moon rises and the time of day the Moon sets on said background chart, respectively, such that upon rotation of said indicator wheel or said background chart, each of said phases of the Moon are revealed through the phase window; and a fastener, said fastener joining said indicator and said background chart at a common center.

16. The field reference chart of claim 15, wherein said phase window is V-shaped.

17. The field reference chart of claim 16, wherein each of said phases of the Moon on said background chart member are revealed through said phase window.

18. The field reference chart of claim 15, wherein each of said phases of the Moon include the name of the phase and the moon phase illustration.

19. The field reference chart of claim 16, wherein said indicator wheel has indicia of a person looking up into said phase window to suggest that the moon phase illustration in the phase window represents how a user would see the phase of the Moon from Earth's surface.

20. The field reference chart of claim 16, wherein the background chart is a one-piece background chart.

* * * * *